(No Model.)

E. NORIEGA.
PROCESS OF AND APPARATUS FOR WORKING ARGENTIFEROUS AND AURIFEROUS ORES.

No. 544,925. Patented Aug. 20, 1895.

United States Patent Office.

ELOY NORIEGA, OF MEXICO, MEXICO.

PROCESS OF AND APPARATUS FOR WORKING ARGENTIFEROUS OR AURIFEROUS ORES.

SPECIFICATION forming part of Letters Patent No. 544,925, dated August 20, 1895.

Application filed January 31, 1893. Serial No. 460,332. (No model.) Patented in Mexico October 29, 1892, No. 355.

*To all whom it may concern:*

Be it known that I, ELOY NORIEGA, a subject of the King of Spain, residing in the city of Mexico, Mexico, have invented a new and Improved Process of and Apparatus for Working Argentiferous and Auriferous Ores, (for which I have obtained a patent in Mexico, No. 355, bearing date October 29, 1892,) of which the following is a specification, reference being had to the annexed drawings, forming a part thereof, in which—

Figure 1:
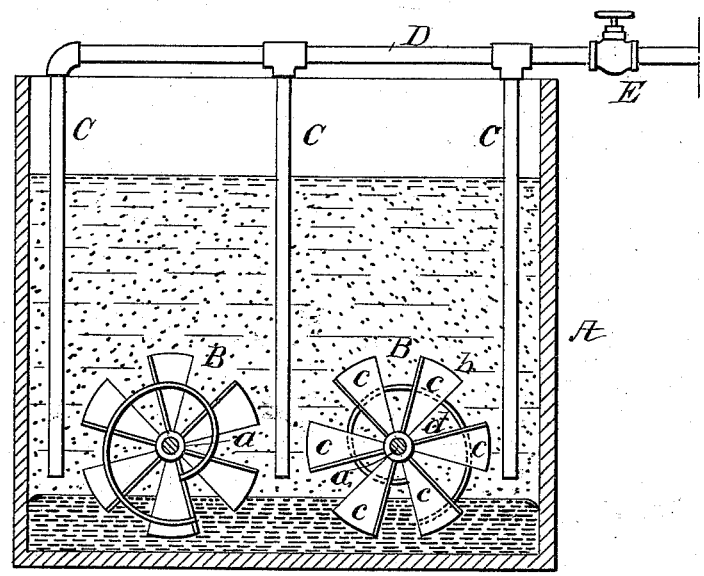
Figure 2:
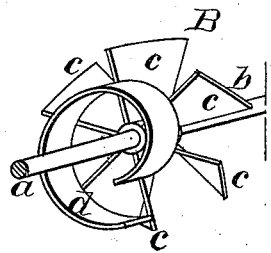

Figure 1 is a side elevation of a tank provided with agitators and supply-pipes, and Fig. 2 is a perspective view of one of the agitators.

Similar letters of reference indicate corresponding parts in both views.

The object of my invention is to work the ores rapidly with economy in the use of quicksilver. In my process I subject the ores to the combined action of steam, reagents, saline solutions, and amalgam, while at the same time I agitate the mass by mechanical means.

The apparatus by means of which my process is carried out is shown in Fig. 1. The tank A is of suitable size and shape to receive the amount of ore to be treated, and in the tank are journaled, in the present case, two shafts $a$, which extend through the walls of the tank and carry within the tank the agitators B. The said agitators are precisely alike, but they are oppositely arranged with respect to each other. Each agitator consists of a screw-propeller $b$, having wings $c$ and a plate $d$ arranged in the form of a volute and secured to the side of the screw. In the tank are inserted steam-pipes C, which are connected with the steam-supply pipe D, controlled by the valve E. The ore is thrown into the tank A, with a suitable quantity of water to make the mass sufficiently fluid to be conveniently operated upon. Then chloride of sodium dissolved in hot water is added. Soon afterward the quicksilver is thrown in in the proportion of about one hundred and ten pounds to a ton of ore, and with the quicksilver is added an amalgam formed of zinc and mercury or copper and mercury in the manner well known to chemists. Then the agitators are revolved by the application of power, and when all of the substances have been mixed by the circulation and thorough agitation of the mass in the tank A, I add either protochloride of copper or protochloride of iron. After all of these substances have been put into the tank and thoroughly mixed, I open the steam-pipe and revolve the agitators at a velocity which may vary from one hundred to one hundred and fifty revolutions per minute. The screws propel the liquid in different directions in the tank, while the volute plates cause an agitation in a radial direction with reference to the shaft. I continue this operation for about fifteen minutes, when the treatment is complete. The quantity of amalgam should be estimated at from one to two grams per pound of mercury used in working the ore. The quantity of chloride of sodium can be determined only in working the ores, and is varied according to the composition of the ores under treatment, and in a similar manner the reagents must be varied according to the ores to be treated. The sulphides of silver and gold are transformed immediately by the combined action of the chloride of sodium and the ferrous chloride or of the cuprous chloride or of both, and are consequently precipitated. To accomplish this it is necessary, as has been stated, to have the combined action of the reagents with the chlorides of sodium, the current of steam, and the continuous agitation.

The particular sequence in which the steps of my improved process are performed is of importance. The mercury becomes floured during the time it is used alone—that is, before the subchloride is added. Thus the floured mercury remains pure, and while it is in this condition the zinc amalgam is added. Upon then adding the subchloride the amalgamation will take place very rapidly, as the mercury is in proper condition for such action and the zinc amalgam causes the generation of electric currents, the subchloride solution acting as an exciting-fluid.

The action of the quicksilver and amalgam is as follows: The zinc of the amalgam reduces the gold and silver chlorides and produces metallic gold and silver. The mercury amalgamates with the precious metals and takes them up.

Having thus described my invention, I claim as new and desire to secure by Letters Patent—

1. The herein described process of treating ores, which consists in first mixing the ore pulp with mercury and zinc amalgam, and then adding to the mixture the subchloride of a suitable metal and introducing steam to heat and agitate the mixture, substantially as described.

2. An agitator for treating ores, formed of a screw propeller, and a plate attached to the screw propeller, and curved in the form of a spiral of gradually increasing diameter substantially as specified.

ELOY NORIEGA.

Witnesses:
JOSÉ GARCIA,
JUAN GARCIA.